United States Patent [19]

Manners et al.

[11] Patent Number: 5,479,631
[45] Date of Patent: Dec. 26, 1995

[54] SYSTEM FOR DESIGNATING REAL MAIN STORAGE ADDRESSES IN INSTRUCTIONS WHILE DYNAMIC ADDRESS TRANSLATION IS ON

[75] Inventors: David C. Manners; Eugene S. Schulze, both of Wappingers Falls; Danny R. Sutherland, Poughkeepsie, all of N.Y.

[73] Assignee: International Business Machines Corporation, Armonk, N.Y.

[21] Appl. No.: 376,543

[22] Filed: Jan. 23, 1995

Related U.S. Application Data

[63] Continuation of Ser. No. 978,606, Nov. 19, 1992, abandoned.

[51] Int. Cl.⁶ ............................................. G06F 12/10
[52] U.S. Cl. ........................... 395/465; 364/DIG. 1; 395/375; 395/481; 395/412
[58] Field of Search ................................ 395/400, 425, 395/800

[56] References Cited

U.S. PATENT DOCUMENTS

| | | | |
|---|---|---|---|
| 4,500,952 | 2/1985 | Heller et al. | 395/400 |
| 4,695,950 | 9/1987 | Brandt et al. | 395/400 |
| 4,843,541 | 6/1989 | Bean et al. | 395/275 |
| 4,943,913 | 7/1990 | Clark | 395/700 |
| 4,945,480 | 7/1990 | Clark et al. | 395/400 |
| 4,979,098 | 12/1990 | Baum et al. | 395/400 |
| 5,008,811 | 4/1991 | Scalzi et al. | 395/400 |
| 5,023,773 | 6/1991 | Baum et al. | 395/425 |
| 5,095,420 | 3/1992 | Eilert et al. | 395/400 |
| 5,129,071 | 7/1992 | Yamagata et al. | 395/400 |
| 5,159,677 | 10/1992 | Rusbam et al. | 395/425 |
| 5,220,669 | 6/1993 | Baum et al. | 395/775 |
| 5,230,069 | 7/1993 | Brelsford et al. | 395/400 |
| 5,237,663 | 8/1993 | Blandi et al. | 395/400 |
| 5,381,537 | 1/1995 | Baum et al. | 395/400 |

OTHER PUBLICATIONS

IBM Enterprise System Architecture/370—Principles of Operation, Aug. 1988, entire book, No. SN22-7200-0.
IBM Technical Newsletter No. SN 22-5279, update of ESA/370 Principles of Operation, 17 Apr. 1989.
IBM Technical Newsletter No. SN22-5342, update of ESA/370 Principles of Operation, 15 Dec. 1989.
Heald, *Address Translation Bypass*, IBM TDB, vol. 18, No. 10, Mar. 1976.
Knight et al., *Segmented Virtual To Real Translation Assist*, IBM TDB, vol. 27, No. 2, Jul. 1984.
Clark et al., *Real Storage Operand Facility*, IBM, TDB, vol. 27, No. 8, Jan. 1985.
Greenberg et al., *Fast Path Virtual Equal Real Addressing*, IBM TDB, vol. 29, No. 7, Dec. 1986.

*Primary Examiner*—Michael A. Whitfield
*Attorney, Agent, or Firm*—William A. Kinnaman, Jr.; William B. Porter

[57] ABSTRACT

A data processing system includes central storage where access to data is by central storage addresses. Instructions normally include a logical or virtual address which is translated to a real central storage address using dynamic address translation (DAT) with or without an access register (AR) translation mechanism. When in AR mode, and with DAT on, addressing of instructions or data in central storage can be effected by specifying real central storage addresses and eliminate the DAT and AR translating process.

6 Claims, 5 Drawing Sheets

SYSTEM FOR DESIGNATING REAL MAIN STORAGE ADDRESSES IN INSTRUCTIONS WHILE DYNAMIC ADDRESS TRANSLATION IS ON

This application is a continuation of application Ser. No. 07/978,606, filed Nov. 19, 1992, abandoned.

FIELD OF THE INVENTION

This invention relates to data processing systems with dynamic address translation (DAT) mechanisms for translating virtual addresses to real main storage addresses, and more particularly to providing a mechanism for allowing instructions to directly designate real main storage addresses with DAT on.

BACKGROUND OF THE INVENTION

Dynamic address translation (DAT) is a function in data processing systems that allows programmers to write programs using virtual or logical addresses, leaving it to a supervisor or control program to store data and programs in real, physical, main memory of a system, and translate the virtual addresses to the real addresses in main memory. This function is found in mainframes of The International Business Machines Corporation, and had a beginning in the IBM System/370 architecture. Enhancements have been made to the function through the System/390, and present ESA/390 architecture.

The following patents, all assigned to the assignee of the present application, describe the use of DAT with the present access register translation (ART) mechanism now defined as part of the ESA/390 architecture. These patents are herewith incorporated by reference to describe these existing functions for which the present invention is a further enhancement:

1. U.S. Pat. No. 4,695,950 entitled "Fast Two-level Dynamic Address Translation Method and Means" by Brandt et al describes the use of segment tables and page tables used as part of the DAT process;

2. U.S. Pat. No. 4,500,952 entitled "Mechanism For Control Of Address Translation By A Program Using A Plurality Of Translation Tables" by Heller et al enhances the DAT process in the previous patent by allowing a program to use more than one set of segment and page tables, namely a primary set and a secondary set.

3. U.S. Pat. No. 4,979,098 entitled "Multiple Address Space Token Designation, Protection Controls, Designation Translation and Lookaside" by Baum et al describes the addition of access registers (AR) for each general purpose register that enter into an access register translation (ART) process for use in designating one of many (more than two as in previous patent) sets of segment and page tables to be used in the DAT process.

The current state of the art, using DAT, allows the execution of computer instructions with either DAT-on or DAT-off. With DAT-on, all computer instructions are available, but essentially all instruction operands must be expressed using virtual addresses. With DAT-off, all instruction operands are expressed as real, physical main store or central storage addresses. This is true when being used with a system that is also operating with access register translation (ART) also active.

MVS/ESA is an operating system, or control program, that manages a system under the ESA/390 architecture. The majority of function and services of MVS/ESA are available and supported only with DAT-on, and since DAT typically provides addressability of virtual storage far in excess of real storage, it is normally highly desirable for programs to execute with DAT-on, including programs comprising the basic operating system control program. There exists instances where programs must access central storage addresses with real and not virtual address. The current state of the art requires that programs with such requirements either perform costly and severely constraining mode switches between the DAT-on and DAT-off execution states, or use an extremely limited set of DAT-on instructions to manipulate only 4 bytes of central storage per instruction.

Additionally, because of the existing difficulties in central storage addressing with DAT-on, some basic control program components implement complex schemes for management of architecture and operating system constructs. For example, virtual storage translation structures, such as segment and page tables, can be managed themselves in virtual storage, but at the complicating expense of managing translation structures for the translation structures. And in turn, if the second level of translation structures are also managed in virtual storage, a third level of translation structures is required to address the second level.

Furthermore, there currently exists no general ESA/390 or MVS/ESA capability to concurrently address central storage and virtual storage addresses. There are several occasions within the course of basic control program execution where such a capability would provide significant potential for path reduction and simplification of program implementation.

SUMMARY OF THE INVENTION

It is an object of the invention to provide for the concurrent addressing of central main storage of a data processing system by instructions using both virtual and real storage addresses when operating with dynamic address translation (DAT) turned on.

It is also an object of the present invention to provide concurrent virtual or real addressing by instructions with DAT-on where either or both the size of virtual or real storage exceeds that which can be specified by 31-bit addresses.

These and other objects, features, and advantages are achieved by two techniques that allow the manipulation of central storage while executing with DAT-on using the complete ESA/390 instruction set containing central storage addresses directly, or by linear transformations of central storage addresses.

The first technique adds to the present ESA/390 architecture by using a presently unused bit in the access register (AR) of an AR/general purpose register (GPR) pair provided in a central processing unit (CPU) when operating in the AR mode. The state of the bit in the AR determines whether normal access register translation (ART) takes place before use of DAT, or whether to interpret the bits of an AR/GPR pair as address bits of a central storage address to be used directly to access a real address in central storage.

The second system uses the normal ESA/390 architecture ART process where a data space is created and a DAT segment and page table set is initialized to provide a one-to-one transformation of a virtual address to a real storage address. When access to real storage addresses are required by any instruction, the AR/GPR pair is selected that allows the normal ART process to use the segment and page tables that make the one-to-one transformation. If central storage is comprised of several banks, each of a size addressed by 31 address bits, then each bank will be addressed by a segment and page table set associated with that bank. Concurrently, other instructions may use AR/GPR pairs to transform virtual addresses of normal address spaces using DAT segment and page tables providing normal virtual to real transformations in accordance with the ESA/390 architecture.

DETAILED DESCRIPTION OF THE INVENTION

The following description of the invention presupposes an IBM ESA/390 machine architecture controlled by an operating system that uses segment and page table sets and access registers for address translation. One embodiment of the invention presupposes an extension to the architecture that will support the present 31 bit addressing but also an addressing capability that can be as large as 63 bits.

Figure 1:
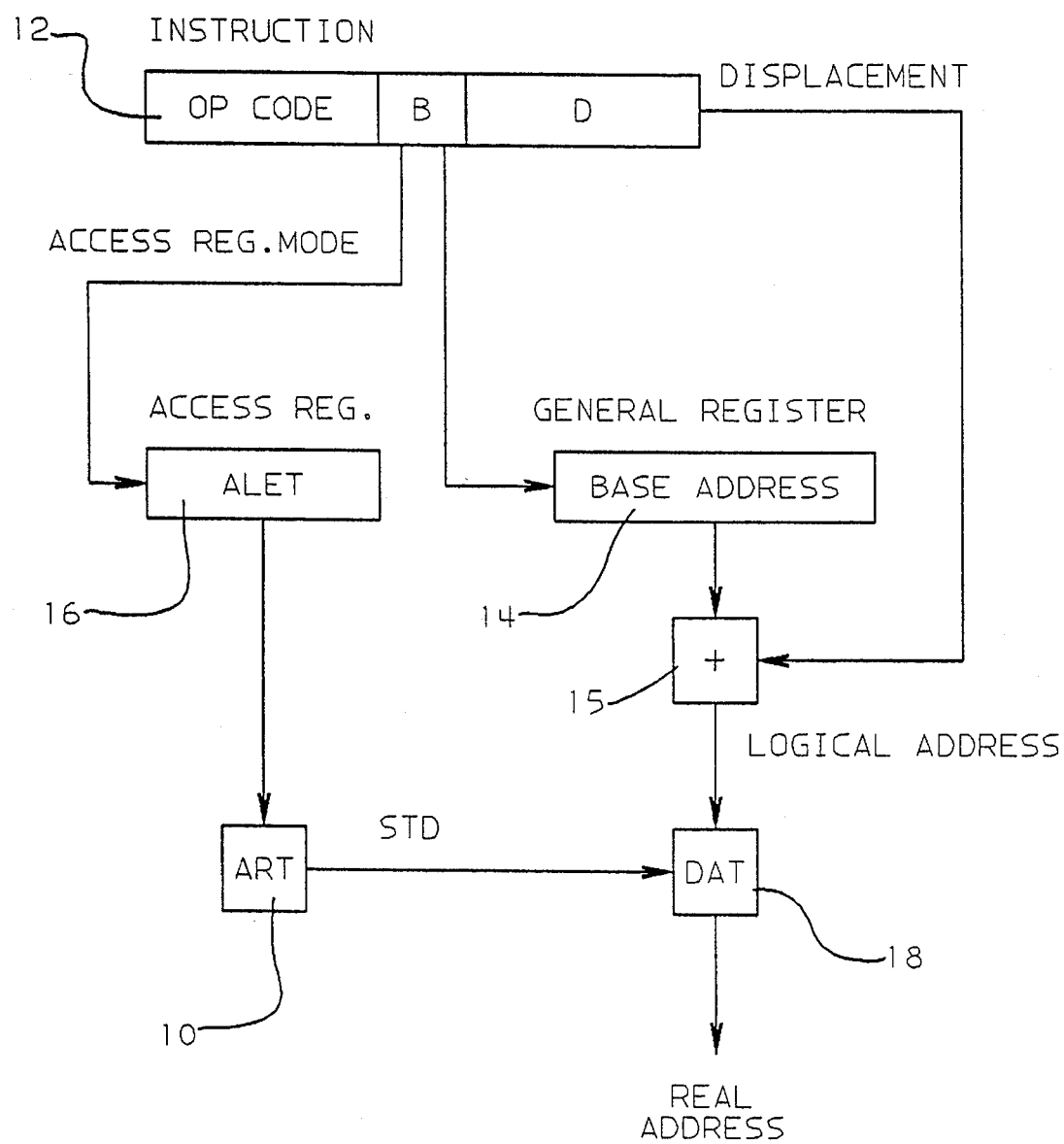
FIG. 1 is a block diagram of the major components/ Utilized for access register translation (ART) and dynamic address translation (DAT) in accordance with the ESA/390 architecture.

FIG. 1 depicts the major components of a central processing unit that implement the present ESA/390 architecture dealing with access register translation (ART) and dynamic address translation (DAT). The process of using the contents of an access register (AR) to obtain access to a related segment table for use in DAT is shown generally at 10. An instruction 12 has an operation code, a B field which designates a general purpose register 14 containing a base address, and a displacement D, which, when joined with the base address of general register 14 by an adder 15, forms a logical address of a storage operand. In the access register mode, designated by a bit in a PSW, the B field also designates an AR 16 which contains an access list entry token (ALET) which, when translated at ART 10, provides the segment table descriptor (STD) which identifies the origin of a segment table for the address space in which the data is stored. The STD from ART 10 is joined with the logical address from the adder 15, and, when translated together in the DAT 18, provides the real address of the operand for use by the system. FIG. 1 is taken from the above cited U.S. Pat. No. 4,979,098 which contains a complete description of the ART and DAT process.

A major component of a computing system is central storage. Central storage is program-addressable storage from which CPU instructions and other data can be loaded directly into registers for subsequent execution. As presently defined in the ESA/390 architecture, addressing is limited to 31 bits whether defining data spaces, size of data spaces, virtual storage, or real storage. Therefore the maximum size of these entities is $2^{31}-1$ bytes (2 gigabytes). The present invention will show the ability to directly address up to $2^{63}-1$ bytes of real storage.

Figure 2:
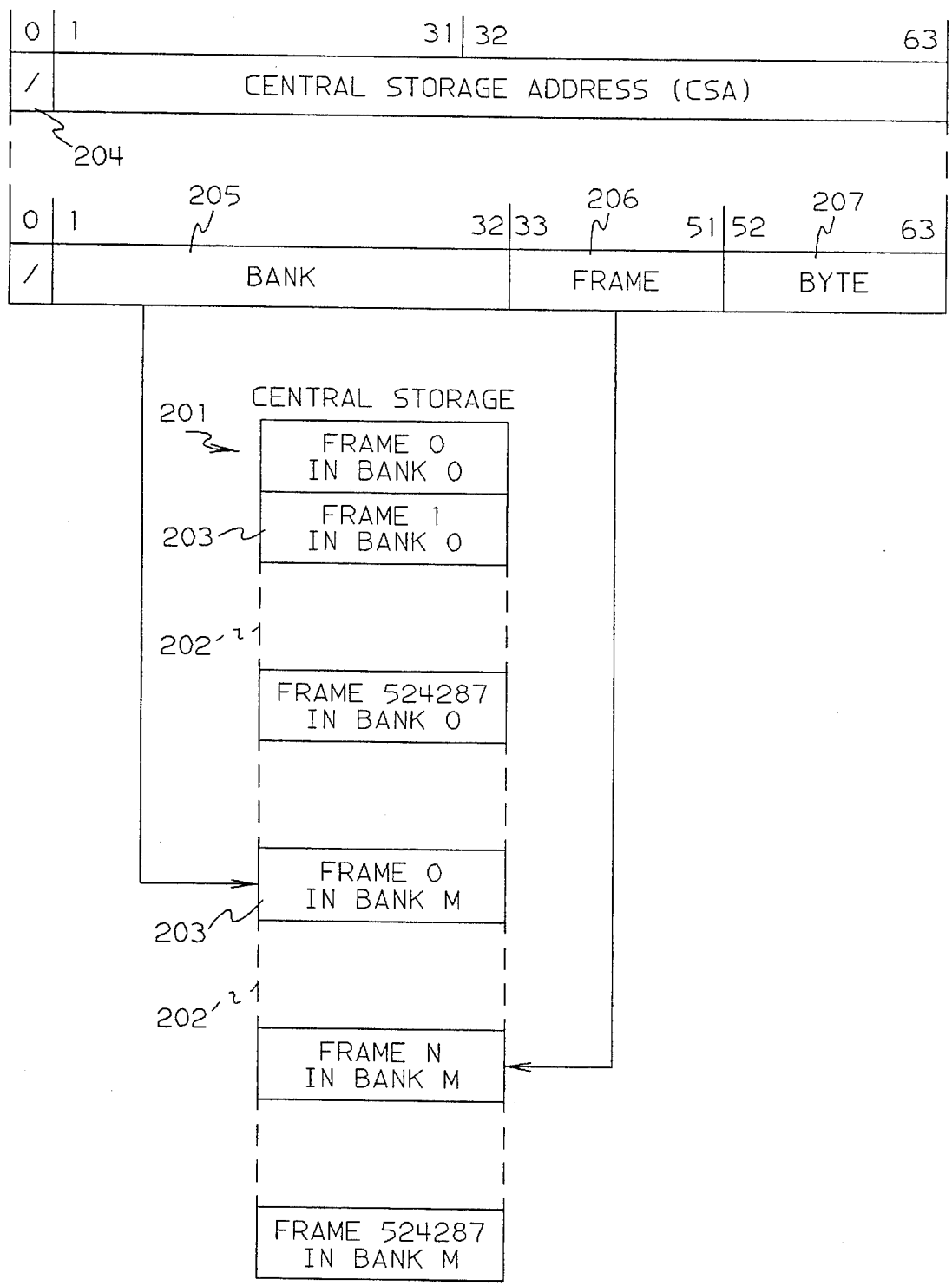
FIG. 2 shows a central storage address (CSA) is interpreted to designate central storage comprised of banks, frames, and bytes.

In FIG. 2 is shown central storage 201 which is defined as byte locations sequenced by their central storage addresses which run from zero up through a maximum of $2^{63}-1$, but may be less. Central storage 201 is partitioned into adjacent but not overlapping units called banks 202, where each bank contains $2^{31}$ sequential bytes except possibly for the last bank which may contain fewer bytes if the amount of central storage available in not a multiple of 2 gigabytes. Note, however, that it must always be a multiple of 4 kilobytes. Each bank is sequentially numbered starting with zero up through a maximum of $2^{32}-1$. Each bank 202 is further partitioned into adjacent, but not overlapping, units called frames 203 where each frame contains 4096 sequential bytes (4 kilobytes=4K). Each frame 203, within its bank 202, is sequentially numbered from zero up through $2^{19}-1$ (524287) except possibly for the frames in the last bank which may contain fewer frames depending on the amount of central storage available.

An arbitrary central storage address 204, which can be any integer value between zero and $2^{63}-1$ can be partitioned such that bits 1 through 32 represent a bank number 205, bits 33 through 51 represent a frame number 206 within the bank, and bits 52 through 63 represent a byte number 207 within the frame. This allows any central storage frame 203 to be addressed by its bank number and frame number. Note that the byte number 207 addresses a particular byte within a frame, but since this level of addressing is not germane to this invention it will not be discussed further.

The addressing scheme presented here allows for a 32 bit bank number, but this may just as easily be less. If less, then those high order bits not participating in the bank number are masked to zeros whenever a bank number is formed.

Figure 3:
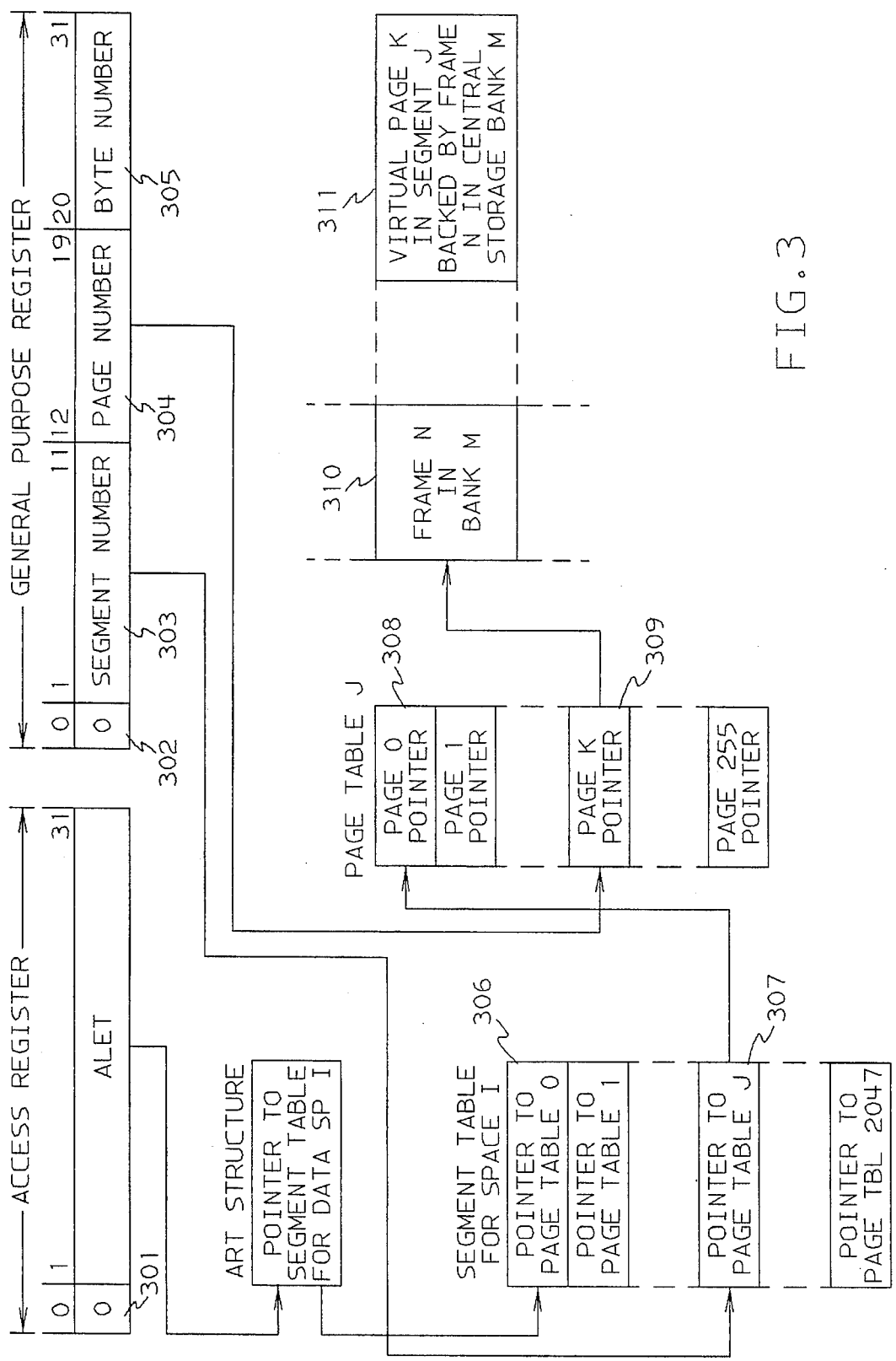
FIG. 3 shows a data space mapping using DAT to provide a virtual address to real storage address transformation.
Figure 4:
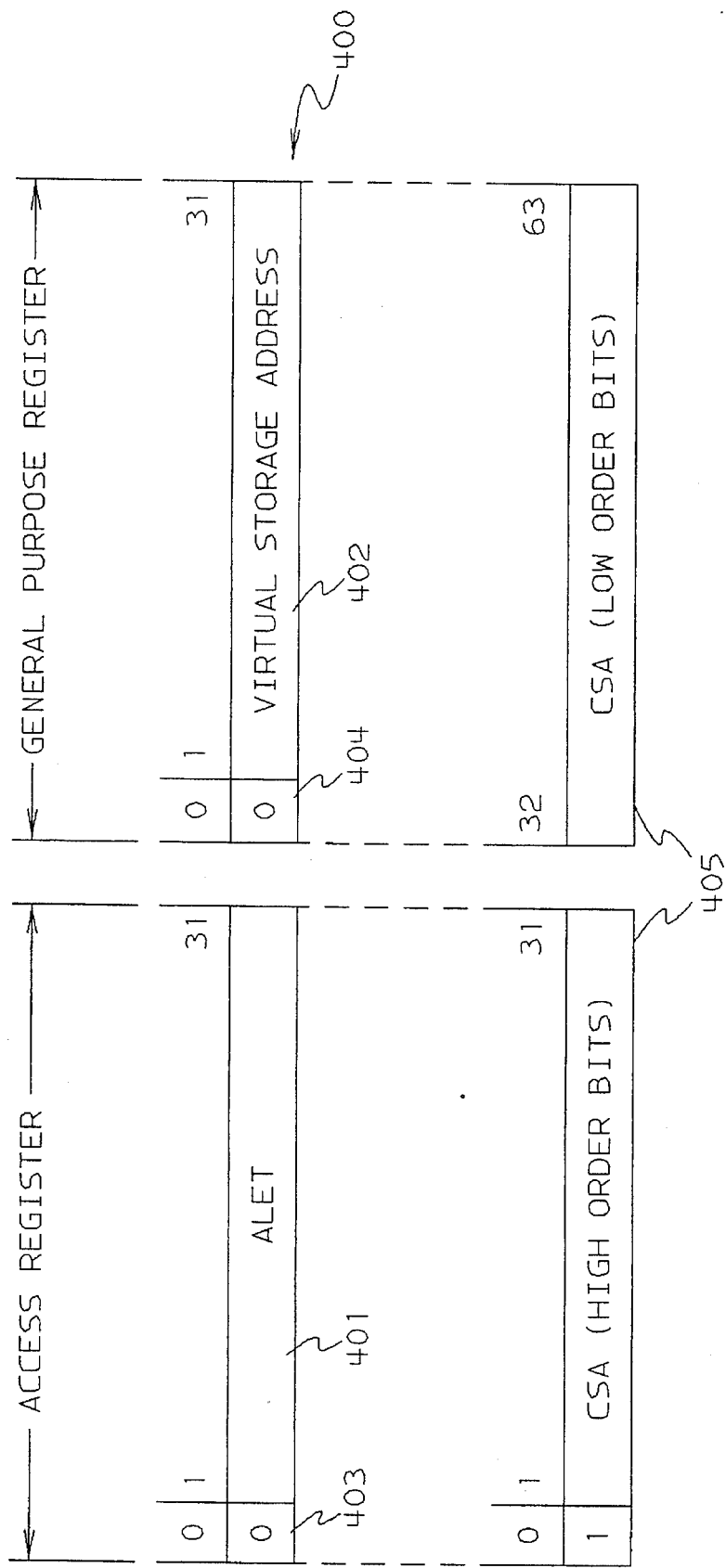
FIG. 4 depicts how the contents of an access register (AR) and general purpose register (GPR) are interpreted to use the contents either as a virtual address or real storage address.
Figure 5:
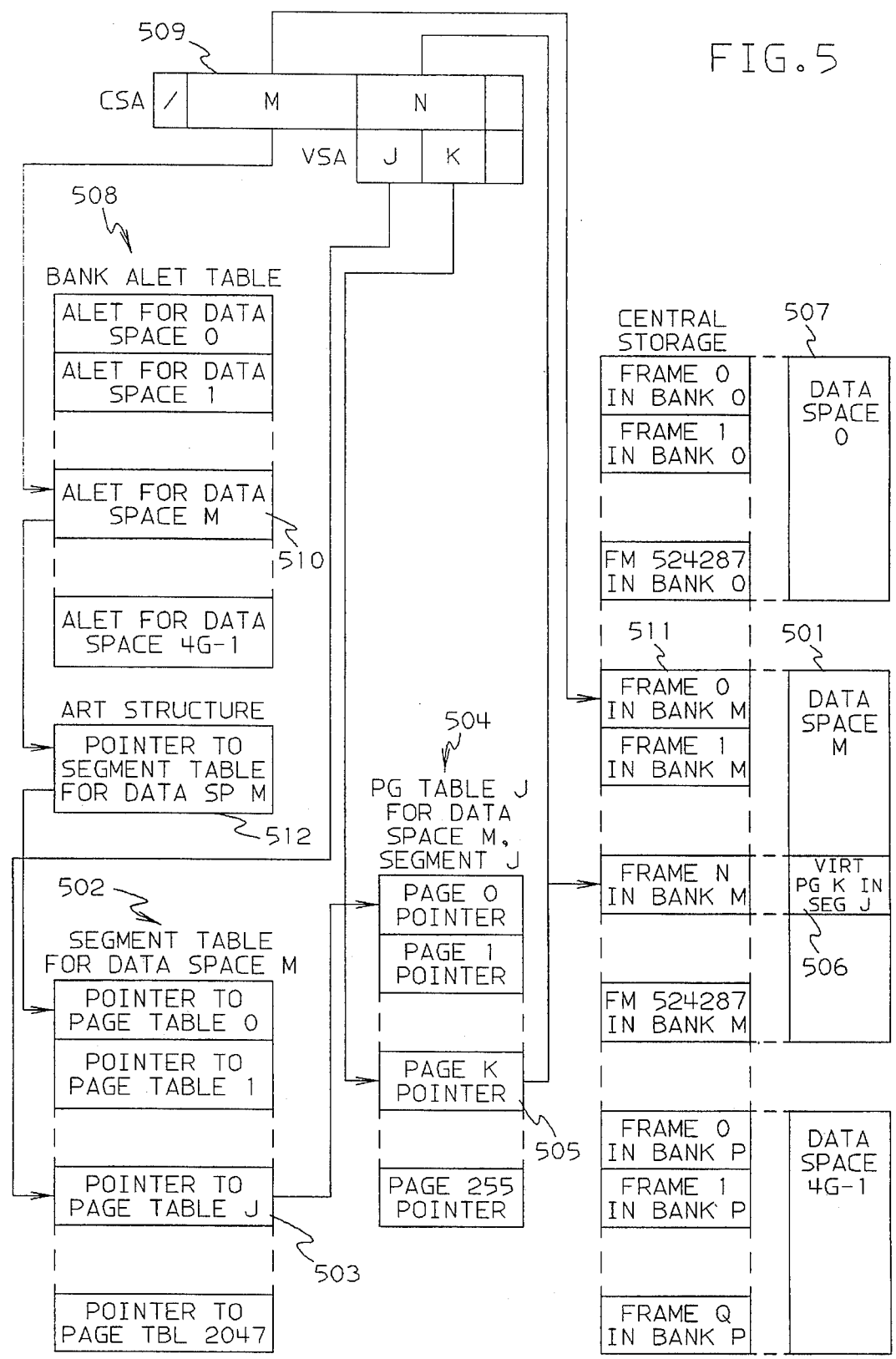
FIG. 5 shows the one-to-one mapping of virtual addresses to central storage addresses when central storage is comprised of a plurality of banks each of a size addressed by 31 address bits.

FIG. 3 expands on the showing of FIG. 1 in its showing of the present ESA/390 architecture use of ART and DAT. That is, a system operating in AR mode with DAT-on. This process uses an access list entry token (ALET) 301 in conjunction with a virtual address 302 contained in an AR/GPR pair. The virtual address 302 is commonly partitioned such that bits 1 through 11 contain a segment number 303, bits 12 through 19 contain a page number 304 within a segment, and bits 20 through 31 contain a byte number 305 within a page.

A segment is defined as a contiguous addressing range of 1 megabyte and where the first address is on a 1 megabyte boundary. A page is defined as a contiguous addressing range of 4 kilobytes and where the first address is on a 4 kilobyte boundary. An address space of 2 gigabytes is represented by a segment table and, given a segment table, a 31 bit virtual address can address each byte in the addressing range.

By means of the DAT process described in the cited references incorporated herein, the segment number 303 is used to index into the segment table 306 to locate an entry 307 which contains a pointer to a page table 308. The page number 304 is then used t index into the page table 308 to locate an entry 309. This entry 309 contains the address of the central storage frame 310 which contains the data for the virtual page 311.

The ALET 301 is used in the ART process to index into the ART structure 312 to yield a pointer to the segment table 306 associated with the ALET 301. Thus, the ALET 301 is used to identify a particular 2 gigabyte data space addressing range and the virtual address 302 is used to address a particular central storage byte in that addressing range.

The preferred embodiment of the invention describes an ESA/390 architectural extension that facilitates the direct addressing and manipulation of the contents of central storage while running a program with DAT-on. The present invention will enable programs to employ instruction operand with either virtual storage addresses or real storage addresses or, in the case of multi-operand instructions, with both if so desired while executing with DAT-on and without any performance degrading need to switch from DAT-on to DAT-off.

Enablement of the present invention requires that the behavior of any CPU is affected by the state of the architectural extension only for programs that are executing with DAT-on and in access register (AR) mode. Any CPU not executing in this mode is not affected by the extension of the present invention.

When executing with DAT-on and in AR mode, virtual storage is accessed by means of operands consisting of an AR/GPR pair 400. In particular, the access register contains an ALET 401 that qualifies the virtual address 402 contained in the corresponding general purpose register. With the current ESA/390 architecture, bit zero 403 of the access register is required to be zero for any such access register used to qualify a virtual address. The present architecture ignores bit zero 404 of the general purpose register leaving the present normal 31 bit address. In this environment the previously described ART and DAT mechanisms are effective.

The present invention redefines AR bit zero 403 such that, in the process of being read in preparation for ART, bit 403 is on (i.e. binary 1), both ART and DAT are bypassed and the contents of the AR/GPR pair 400 are interpreted as a real storage address (CSA) 405 of up to 63-bits. The bits in the GPR form the low order portion of the CSA while bits in the AR form the high order portion of the CSA. AS discussed previously, the number of bits, if any, that form the high order portion of the CSA can vary with the amount of central storage available and does not affect the present invention. If bit zero 403 of the AR is zero, or if the CPU is not executing with DAT-on in AR mode, then operations are performed as defined without the presently defined extension of the invention.

A second embodiment of the present invention demonstrates a method to map real storage addresses to virtual storage addresses such that any CSA can easily be converted to a virtual storage address that represents a virtual page that is backed by a central storage frame that is the exact frame addressed by the CSA. This enables operations on central storage, with DAT-on to be achieved by addressing the central as virtual, and hence all ESA/390 instructions that operate on virtual storage can be used to directly operate on central storage. Key to this embodiment is the establishment of virtual addressability to central storage through a set of data spaces that have been created in accordance with the present ESA/390 architecture. The presently defined use of the ART and DAT structures is maintained.

A data space 501 is a virtual storage construct that provides addressing for up to 2 gigabytes defined by 31 bit addresses. Being a virtual storage construct, all addresses contained within it are maintained by segment and page tables commonly use by the previously defined DAT structure. A full data space of 2 gigabytes requires one segment table 502 with 2048 entries where each segment table entry 503 serves as a locator or pointer for a page table 504. Each page table 504 describes 1 megabyte of virtual storage, commonly called a segment, and consists of 256 page table entries 505. Each page table entry 505 describes exactly one page (4096 sequential bytes) of virtual storage 506. A page table entry is said to describe a virtual page when the page table entry 505 contains a valid locator of the central storage frame containing the data for the virtual page.

To enable this invention, a data space 507 is created for each and every bank of real storage implemented in the system. Each of these data spaces 507 is 2 gigabytes in size, the same size as a bank of central storage, except possibly for the last data space which may be smaller, but is the same size as the last bank of central storage. These data spaces are referred to as V=C data spaces because they form a one-to-one mapping with central storage. Every central storage frame within any bank is uniquely mapped by that page, in the V=C data space associated with the bank, whose virtual address (omitting the byte number) is the same as the number of the frame. Each virtual page in a V=C data space maps to that frame of central storage whose offset within the bank of central storage, associated with the data space, is the same as the offset of the page within the data space.

It is important to note that the segment table 502 and page tables 504 describing the virtual pages of each V=C data space exist only in central storage. They do not exist in virtual storage. Therefore, the complexity and performance encumbrance of constructing multiple layers of page tables to describe them in virtual storage is avoided.

To further enable this invention, the initialization process also constructs another control block called a bank ALET table 508 with exactly one entry for each V=C data space and thus central storage bank. The bank ALET table 508 is constructed such that any arbitrary entry i contains the ALET for V=C data space for bank i. Hence, the ALET for that unique V=C data space m that is associated with central storage bank m can be obtained by entry m in the bank ALET table 508.

Each V=C data space page is backed by that central storage frame whose frame number is exactly the same as the page's virtual address (when omitting the byte number) and whose bank number is an index to the bank ALET table 508 entry that contains the ALET of the data space.

All translation tables are initialized so that all V=C data space virtual pages appear valid in central storage and can be referenced by programs without causing any translation exceptions to occur which could be possible with normal data spaces. With this structure intact, central storage may be accessed with DAT-on by using central storage addresses as virtual storage addresses.

For example, take an arbitrary central storage address 509 having some bank number m and some frame number n. That is, a CSA of $(m \times 2G)+(n \times 4K)$. The bank number m is extracted from the CSA to form an index into the bank ALET table 508 to locate entry m 510 in the table. This yields the ALET of V=C data space m 501 associated with central storage bank m 511 which is then loaded into some access register i as part of the ART structure 512. The frame number n from the CSA is used and treated as a virtual storage address (omitting the byte number). That is, logically consider it as virtual page k in segment j where $n=256 \times j+k$. This value is placed in the general purpose register i which corresponds to access register i. These values (ARi/GPRi pair) are used as appropriate in CPU instructions to access the V=C data space virtual storage and hence, the associated real storage address.

In both of the embodiments just described, the desired ability to concurrently directly address central storage and address central storage using virtual addresses entering into the ART and DAT process, is achieved with DAT-on without having to force the system into executing a state change from DAT-on to DAT-off.

While we have illustrated and described the preferred embodiments of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. An apparatus for addressing a required central storage location in a system with central storage having central storage addresses and a dynamic address translation (DAT) mechanism for translating a specified virtual storage address into an associated central storage address, said apparatus comprising:

means for storing a DAT indicator having a first value to indicate that DAT is enabled in the system, and a second value to indicate that DAT is disabled in the system;

an access register mechanism comprising a plurality of registers storing address data, usable by said DAT mechanism in performing said translating when the system is executing an instruction while in access register (AR) mode with DAT enabled; and translation means coupled to said DAT indicator for utilizing an address specified by an instruction being executed in said AR mode for referencing a predetermined central storage address directly using said address as a central storage address while said DAT indicator has said first value and for referencing a predetermined central storage address indirectly through said DAT mechanism using said address as a virtual address while said DAT indicator has said second value.

2. The apparatus of claim 1 wherein:

each of said plurality of registers in said access register mechanism means comprises means for storing a real address indicator used by said translation means.

3. The apparatus of claim 2 wherein:

said real address indicator has either a first or second binary state;

said translation means includes inhibit means connected to said real address indicator, for preventing operation of said DAT mechanism when said real address indicator in a particular register of said plurality of registers has said first binary state, and utilizing the address data in said particular register as a central storage address; and said translation means includes means connected to said real address indicator, for utilizing in said DAT mechanism the address data in said particular register when said real address indicator in said particular register has said second binary state.

4. The apparatus of claim 1 wherein:

said translation means comprises table means effecting the mapping of addresses of a data space to addresses of said central storage so that a reference to a virtual address within said data space results in a reference to the predetermined central storage address, and the predetermined central storage address has a fixed relation to the virtual address.

5. The apparatus of claim 3 wherein said table means comprises:

M entries, each entry identifying a data space represented by a DAT segment table effecting the translation of the virtual address to the predetermined central storage address.

6. The apparatus of claim 5 wherein central storage is comprised of:

M banks of storage, each bank comprising X segments, and each segment comprising Y pages of 4K bytes, whereby:

each virtual address identifies one of said M banks of central storage and one of X×Y frames within each bank, and said DAT segment table associated with the one said M bank effects the translation of the virtual address to the corresponding central storge address within the identified one of the M banks of central storage.

* * * * *